United States Patent
Bechtold

(10) Patent No.: US 6,524,677 B1
(45) Date of Patent: Feb. 25, 2003

(54) BASE PLATE, IN PARTICULAR FOR PREPARATION OF CONCRETE PRODUCTS

(76) Inventor: Heinz Bechtold, Siegfriedstrasse 31, D-6121 Mossautal (DE)

(*) Notice: Subject to any disclaimer, the term of this patent is extended or adjusted under 35 U.S.C. 154(b) by 0 days.

(21) Appl. No.: 07/949,567

(22) Filed: Jun. 29, 1992

Related U.S. Application Data

(63) Continuation of application No. 07/665,111, filed on Mar. 6, 1991, now abandoned.

(30) Foreign Application Priority Data

Sep. 25, 1990 (DE) ............................................ 40 30 232
Dec. 20, 1990 (DE) ............................................ 40 40 905

(51) Int. Cl.⁷ .................................................. B32B 3/30
(52) U.S. Cl. ............................... 428/57; 428/45; 428/98; 428/192; 428/903.3
(58) Field of Search ................................. 428/903.3, 45, 428/57, 98, 192; 108/901

(56) References Cited

U.S. PATENT DOCUMENTS

| | | | |
|---|---|---|---|
| 3,552,329 A | 1/1971 | Parris | 108/51 |
| 4,397,246 A | 8/1983 | Ishida | 108/55.3 |
| 4,597,338 A * | 7/1986 | Kreeger | 108/51.1 |

FOREIGN PATENT DOCUMENTS

| | | | |
|---|---|---|---|
| DE | A-1756873 | 8/1970 | B65D/19/24 |
| DE | A-2133387 | 1/1973 | B65D/75/00 |
| DE | A-3600174 | 7/1987 | B65D/19/32 |
| DE | U-9013471 | 1/1991 | C08L/23/02 |
| DE | U-9017200 | 6/1991 | C08J/11/06 |
| GB | A-427949 | 5/1935 | |
| GB | A-770334 | 3/1957 | B65D/10/24 |
| GB | A-1168418 | 10/1969 | B65D/19/32 |
| GB | A-2226806 | 7/1990 | B65D/19/26 |

OTHER PUBLICATIONS

The Council for Solid Waste Solutions, "Recycling Mixed Plastics; New Markers".*

* cited by examiner

Primary Examiner—Rich Weisberger
(74) Attorney, Agent, or Firm—Fulbright & Jaworski LLP

(57) ABSTRACT

Based plates made of plastic wastes may be used to replace bass plates made of soft woods or tropical hard woods, such as used in the concrete industry to produce composite blocks, plates, blocks, curbstones or the like The base plates may be mad by plasticizing and extruding the thermoplastic component

14 Claims, 2 Drawing Sheets

BASE PLATE, IN PARTICULAR FOR PREPARATION OF CONCRETE PRODUCTS

This is a continuation application of application Ser. No. 07/66.5,111 filed Mar. 6. 1991 now abandoned.

BACKGROUND OF THE INVENTION

1. Field of the Invention

The invention relates to a base plate and particularly a plate for use in, production of concrete products.

2. Description of the Related Technology

As show in FIGS. 1 and 2, an empty base plate 20 taken from a plate storage 30 is introduced into a molding machine 10 during production of concrete products (composite blocks, plates, blocks, curbstones). The molding machine 10 includes a vertically movable mold 11, a press plunger 12 and a die plate 13. The base plate 20 is placed onto a vibrating table 14, which may be vibrated by an eccentric wheel or cam 15 or the like. Following the insertion of the base plate 20, the mold 11 is lowered onto: the plate 20 and filled from above with a mixture of cement and sand. The mixture is then densified by the pressure of the press plunger 12 lowered from above and the vibration of the table 14. Subsequently the press plunger 12 and the mold 11 are raised and the plate 20, with the molding, is pushed from the molding machine 10 onto conveyer rails 40. The plate 20 and the molding, are optionally moved by a stacking carriage 50 to a drying room 60 on. The molding is hardened in the drying room 60 conveyor rails 40. In a discharge station 70, the hardened molding is taken as a finished concrete product 80 from the base plate 20. The base plate is then returned to plate storage 30 for drying.

If the bate plates are equipped* on their bottom side, with stacking feet the base plates 20 may be stacked directly on rails in place Of a stacking carriage 50. In this case, the mutual distance of the stacking feet is sufficiently large so that when stacked a lower molding fits between the stacking feet of a plate 20 stacked above the lower molding. The bending rigidity of the base plate 20 must be high even when in extended storage and with the potential application of drying heat as the loaded base plate 20 rests on only two border areas on rails 40, the rails of the stacking carriage 40, the control rails of the drying room 80 or on stacking feet. If the base plate 20 is not entirely flat, hair cracks will develop during the hardening of the hardened concrete-sand mixture which render the finished concrete product useless.

Solid wood plates have been used heretofore to satisfy the aforementioned requirements of high base plate bending rigidity. The plates were assembled of individual planks, drawn together with steel reinforcing bars and protected on the frontal sides with metal profiles. As the wood, Spruce, larch or tropical hard woods have been used, with dimensions of 1400 mm×900 mm×50 mm, variable depending on the surface area required and on the strength of the wood used (hard or soft wood). Due to their assembly from individual planks, wooden, base plates have joints at the contact locations of the planks which interrupt the smoothness of the surface. Surface changes also occur over time due to the unavoidable abrasion and climatic effects on the wood. Furthermore, wooden base plates must be carefully maintained (regular oiling or spraying with impregnating agents and regular turning, so that both surfaces are used), in order to extend their useful life over a period of 2 to 5 years (depending on the type of wood).

The replacement of wooden materials by a plastic has, been heretofore unsuccessful because the plastics considered suitable for high loads would be significantly more expensive than wood. The increasing public criticism of the destruction of tropical rain forests further converts the use tropical hard woods into an environmental problem, which cannot be solved by the exclusive use of the spruce and larch wood, as soft woods may be used up to:certain loads only and they have less favorable production properties.

SUMMARY OF THE INVENTION

It is an object of the invention to create a base plate, which provides a permanent smooth surface requiring no maintenance even under very high loads, without being appreciably more expensive than conventional base plates, This object is attained according to the invention by a base plate prepared from contaminated plastic wastes composed of between 70 and, got polyolefins by weight, between 0 and 15% polystyrene by weight, between 0 and 10% polyvinylchloride by weight and a residual proportion of other plastics and contaminants, plasticizing and extruded in the thermoplastic containing plastic components. Advantageously, the mixture contains at least polyolefins, polystyrene and polyvinylchloride.

The material may include fiber-containing material is added in a loose or continuous form. The fiber-containing material may be glass, wood, textile and/or plastic fibers. The fiber containing material may be added in the form of a fabric, a knit a mat. According to the invention, the edge zones of the body of the plate may exhibit embedded reinforcing pipes or rails. Alternatively, the plate may exhibit surface mounted reinforcing tails on the plate edges. The height of the reinforcing rails may be equal to or smaller than the height of the body of the plate. The reinforcing plates may have an essentially C shaped profile. Free ends of the C shaped profiles may include hook like projections cast into the body of the plate.

According to a further feature of the invention, stacking feet may be molded on the bottom side of the body of the plate, or on both the top and bottom side.

The base plate according to the invention may be produced from recycled plastic materials in a single piece and may optionally include molded stacking feet. Abutting joints and other changes in the flat surface, such as those found on wooden base plates, are eliminated. Furthermore, no maintenance is required and unlimited storage period are possible. The abrasion strength of the recycled plastics is considerably higher than that of wood, which altogether results in a significantly longer useful life than that of wooden materials. The utilization of plastic wastes as the raw material rather than tropical hard woods render the base plate of the invention especially friendly to the environment. The production costs of the base plate according to the invention are comparable with or even lower than those of wooden plates due to the use of plastic wastes as the initial material. The base plate according to the invention has been found highly suitable in view of the aforementioned advantages.

DETAILED DESCRIPTION OF THE PREFERRED EMBODIMENT

Figure 1:
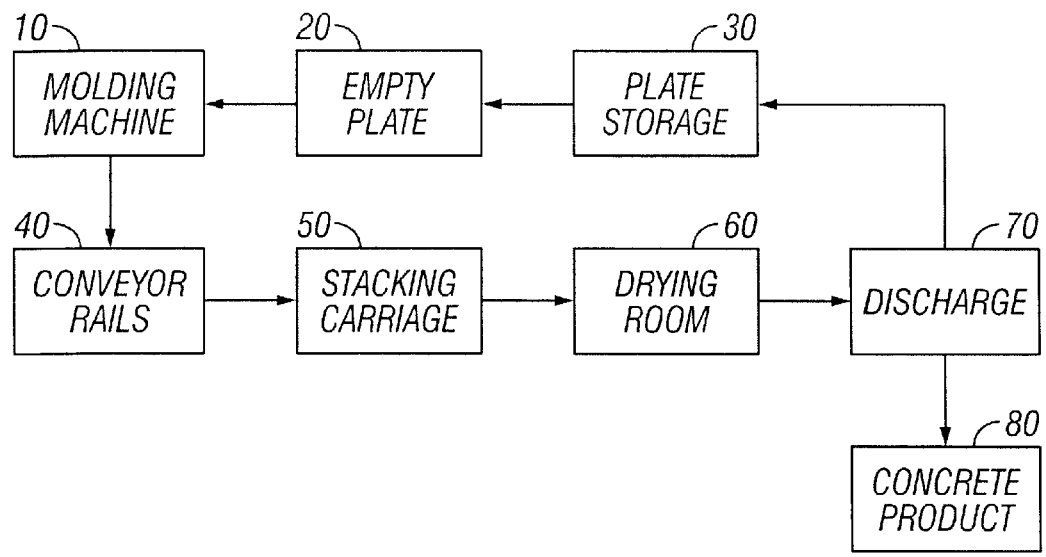
FIG. 1, shows a block diagram of a production plant for composite concrete blocks and plates.
Figure 2:
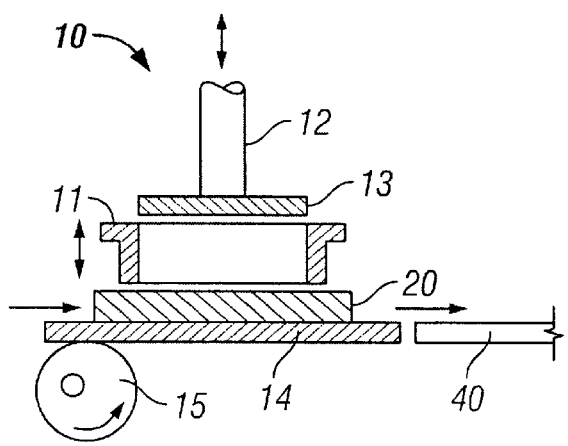
FIG. 2, shows a schematic view of a molding machine in the plant according to FIG. 1 for the production of composite concrete block and plates.

The production plant according to FIG. 1 and the molding machine 10 according to FIG. 2 are already explained in the preceding introduction. The base plate 20*a* shown in FIG. 3*a* includes of a prism shaped plate body, produced according to the preferred embodiment essentially from plastic wastes (recycled plastics). The plastic wastes contain a high proportion of thermoplastics, especially of polyolefins which when charged into an extruder, (a roll extruder or screw extruder), are melted essentially by the heat of friction and homogenized. If the plastic wastes also contain non-melting components, the plastic wastes charged in a comminuted form, are further comminuted or ground in the extruder and incorporated in the thermosplastic melt in the form of granules. The plastic melt exiting from the extruder (possibly together with the residual non-melting granules embedded in it) is filled into a plate mold and hardened therein. It is, however, also possible to press the plastic melt by a plastic press in a plate mold such as a press mold.

Plastic wastes with the following composition may be used for the production of plate bodies we 70–90% by weight polyolefins, 0–15% by weight polystyrene, 0–10% by weight polyvinylchloride, and optionally residual components of other plastics and/or impurities.

Although in many cases a base plate made of recycled plastics has adequate mechanical properties, in particular an adequate bending Strength, fiber containing material or material in powder form may be added to the plasticized plastic mass before or duping the filling of the plate mold, in a loose, irregular form. The fibers or powder particles 21 (FIG. 3*a*) are then present in the plate cross section in a random distribution, which improves the mechanical strength, in particular the bending rigidity. It is also possible to provide the fibers or powder particles only in zones of the plate subject to high mechanical stress or to enrich the concentration in such zones. In order to improve the bending properties of the plate 20*a* even more specifically it is also possible to provide the fibers or particles only in zones of the plate subject to a high mechanical stress or to enrich them in these zones. The concentration of the fibers or powder particles 21 is such that all of the fibers or powder particles 21 are embedded in the thermoplastic material, in order to create an active combination with said thermoplastic materials in the sense of an increase in mechanical properties.

In place of or in addition to the loose fibers, such materials may be added in contiguous form. The materials may be in the form of a fabric designated 22 in FIG. 3*b*, or a knit or a fiber mat, into the mass to produce a base plate. The fiber layer (fabric knit or mat) 22 in FIG. 3*b* is located in the neutral bending zone, i.e. in the center plane of the base plate 20*b*. It is further possible to locate the fiber closer to the top surface of the plate or to provide more than one layer of fibers.

The fibers, in all of the embodiments (FIGS. 3*a*, 3*b*) may be glass, textile, natural or plastic fibers or mixtures thereof. Suitable natural fibers are wood or sisal fibers. The length of the fibers should be coordinated with the strength of the plate desired.

Chalk or ashes (for example blast furnace ashes) mar be used as the material in powder form, where it is important in all cases to obtain the most intimate bonding between the powder particles Or the fibers and the thermoplastic melt.

Figure 3A:
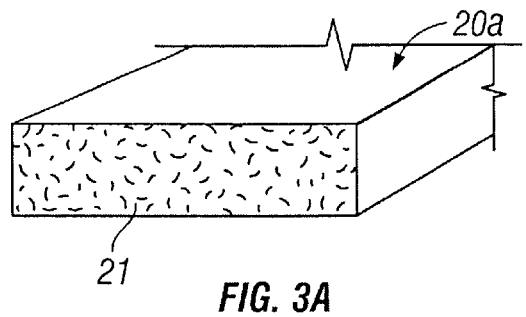
FIGS. 3a–3d show perspective cross sections through four different embodiments of a base plate according to the invention, used it a production plant according to FIG. 1 and inserted into the molding machine according to FIG. 2.
Figure 3B:
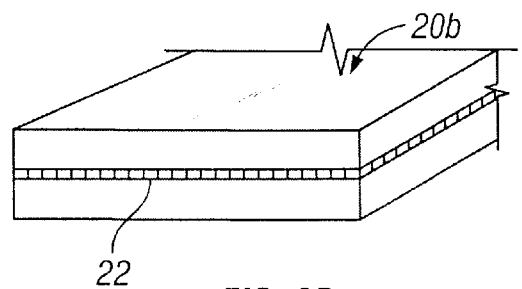

In addition to or in place of the addition of fibers or powders according to FIG. 3*a* and 3*b*, the strength of the base plates may be increased by embedding reinforcing pipes or bars 25 (FIG. 3*d*) in the body of the plate or by casting reinforcing rails into longitudinal edges of the body of the plate. In the embodiment according to rig. 3*d,* the reinforcing pipes 25 are located parallel to the longitudinal edges of the plate body. The reinforcing pipes may be provided at least in the area of the edge zones of the plate body. In the embodiment shown in FIG. 3*d,* an additional reinforcing pipe or rod may be provided in the longitudinal axis of the plate body. The numbed of reinforcing pipes or rods 25 and their diameter depend an the thickness of the plate body and the mechanical properties desired of the finished base plate 20*d.* In any case, care must be taken that the reinforcing pipes 25 are surrounded, by, sufficient thermoplastic materials to insure an active connection between the thermoplastic material and the reinforcing pipes. Structural steel is preferred as the material for the reinforcing pipes, with the pipes 25 provided in a solid or a hollow shape. In the case of hollow pipes thermoplastic material may be poured into the reinforcing pipes.

Figure 3C:
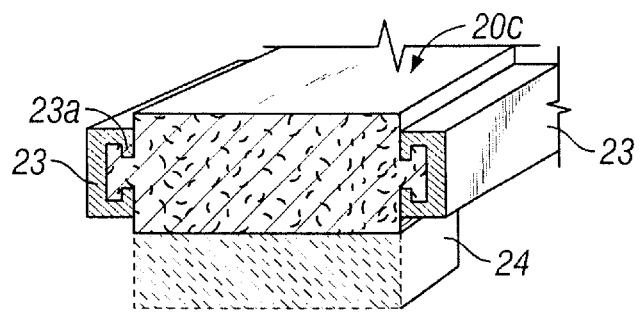
Figure 3D:
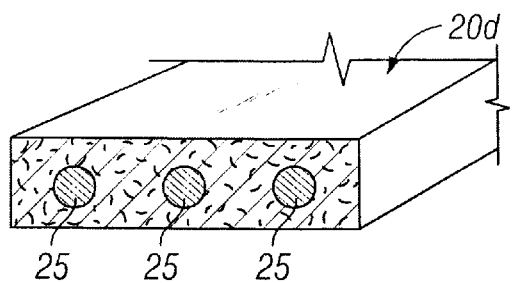

In the embodiment according to FIG. 3*c,* the reinforcing rails 23 located on the longitudinal edges exhibit an essentially C-shaped profile, the free ends of the C profile may be provided with hook like extensions 23*a* to anchor them on the body of the plate. The reinforcing rails 23 may be inserted during the molding of the plate body into the mold and cast in, so that they are positively connected to the thermoplastic material of the plate body, thereby enhancing the mechanical properties of the latter. The thickness (height) of the plate body mat be chosen so that the top and bottom side of the finished base plate 20*c* projects past the top and bottom sides of the reinforcing rails 23, as shown at an enlarged scale in FIG. 3*c*. This projection of the plate body insures that only the plastic surfaces of the base plate 20*c* are active in the production of concrete products. However, the reinforcing rails 23 may also be applied flush with the surface. Furthermore, other profiles of the reinforcing rails 23 are also possible, for example a T shape, the shank of which is anchored in the body of the plate, or a U shape, the legs of which are molded into the body of the plate.

Integral stacking feet 24 (FIG. 3*c*) may easily be molded together with the plate bottom side or bottom and top side of the plate body in canting in all of the embodiment according to FIGS. 3*a* and 30. It is also possible to screw the stocking feet, as it is customary in the case of wooden plates, onto the base plates according to the invention. The stacking feet 24 may then extend continuously over the frontal sides of the base plate 20*c,* as indicated in FIG. 3*c,* transversely to the reinforcing rails 23.

It is possible to use the base plates for purposes other than the production of concrete products, for example as transport pallets or cladding plates, such as those used in construction.

I claim:

1. A base plate configured for preparation of concrete products comprising:

a planar support body made of a plate material, wherein said plate material includes an extruded or pressed thermoplastic component containing recycled plastic waste; and reinforcing rails located at longitudinal edges of said planar support body;

wherein said reinforcing rails exhibit a height smaller than said planar support body resulting in a projection of the finished product past the top and bottom sides of the reinforcing rails.

2. A base plate according to claim 1 wherein said plate material further comprises a powdered filler.

3. A base plate according to claim 2 wherein said powdered filler is selected from the group consisting of chalk and ash.

4. A base plate according to claim 1, wherein said thermoplastic component further comprises a fibrous material.

5. A base plate material according to claim 4, wherein said fibrous material is selected from the group consisting of glass, wood, plant, animal and plastic fibers.

6. A base plate according to claim 4, wherein said fibrous material is present in a form selected from the group consisting of woven fabric, knit, woven mat, and non-woven mat.

7. A bass plate according to claim 1, further comprising embedded reinforcing elements.

8. A base plate according to claim 1, wherein said reinforcing rails exhibit an essentially C shaped profile.

9. A base plate according to claim 8, wherein said rail is configured to interlock with the base plate edge.

10. A base plate according to claim 1 further comprising feet connected to a bottom side of said support body.

11. A base plate according to claim 11, wherein said feet are molded on said support body.

12. A base plate according to claim 1, wherein said plate material consists essentially of contaminated recycled plastic wastes.

13. A base plate according to claim 1 wherein said plate material comprises a mixture of polyolefine, polystyrene and polyvinylchloride.

14. A base plate according to claim 1 further comprising:

feet integrally connected to a bottom side of said support body.

* * * * *